G. Combs.
Washing Mach.
No 96,888. Patented Nov. 16, 1869.
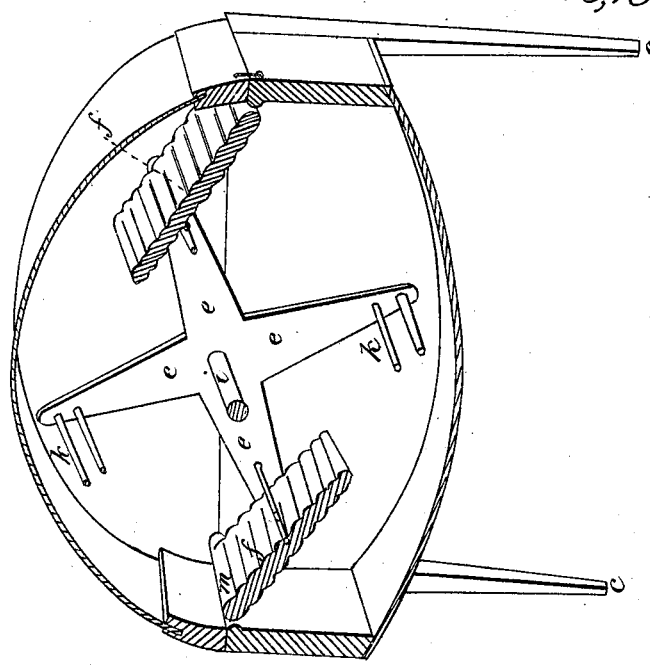
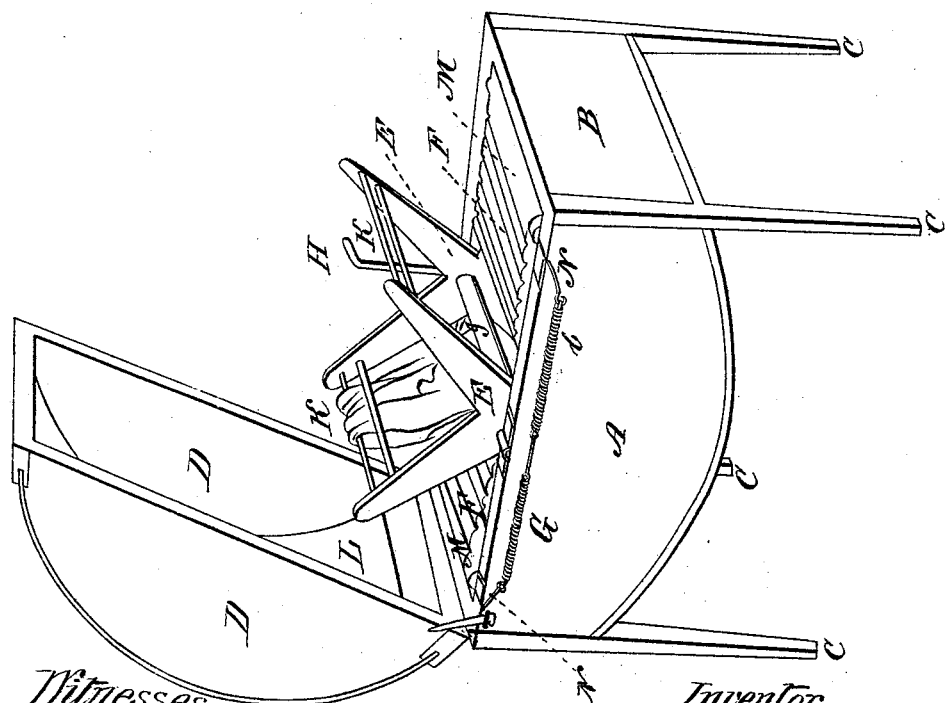
Witnesses.
J. Benedict
J. E. L. Hamilton
Inventor.
George Combs

United States Patent Office.

GEORGE COMBS, OF UTICA, NEW YORK.

Letters Patent No. 96,888, dated November 16, 1869.

IMPROVED WASHING-MACHINE.

The Schedule referred to in these Letters Patent and making part of the same.

*To all to whom it may concern:*

Be it known that I, GEORGE COMBS, of the city of Utica, in the county of Oneida, and State of New York, have invented new and useful Improvements in Washing-Machines; and I do hereby declare that the following is a full and exact description thereof, reference being had to the accompanying drawings, and the letters of reference made thereon.

The nature of my invention consists in the construction, arrangement, and application of the self-adjusting wash-boards F F, grooved on both sides, and the combination and application of the self-adjusting wash-boards F F with the springs G G and reel E E, attached to the shaft I and crank H, in such a manner as to rub both sides of the clothes, by changing or reversing the motion of the crank, at the will of the operator.

Figure I represents a front elevation of the machine with the cover up.

Figure II represents a sectional view of the inside of the machine.

To enable others skilled in arts to understand and use my invention, I will now proceed to describe the manner in which it may be carried into effect.

By a reference to the drawings, which accompany and form part of these specifications—

Fig. I represents the washing-machine ready for use.

The sides A, ends B, legs C, and sides of the cover D D, are constructed of wood, and the top of the cover L is constructed of zinc or wood, as shall be found most convenient.

The reel E E K K is constructed of wood, and attached to the shaft I, to which the crank H is attached, and the whole being upon and across the sides of the box A, so as to be easily revolved, as represented in Fig. I.

The wash-boards F F are constructed of wood, enough shorter than the reel E K to allow the arms E to pass between them and the box A, and hung upon shafts, M M, at each end of the box A B, so as to be easily moved up and down.

To one end of each of said shafts M M, is attached small pitmen N N, as represented in Fig. I; to the ends of which pitmen, I attach spiral or rubber springs, G G, in such manner that the boards, when not in use, lie horizontal and in a line with each other, and allow them to move freely either way, when brought in contact with the clothes on the arms K.

The cover D L is attached to the box A B with ordinary hinges, and a ratchet-hook on each side, to prevent it from falling over when opened.

Having now described my invention,

What I claim as new, and desire to secure by Letters Patent, is—

1. The arrangement and combination of the pitmen N N and springs G G, with the wash-boards, substantially as and for the purposes herein described and set forth.

2. The combination of the self-adjusting wash-boards F F with the springs G G, reel E K, shaft I, crank H, pitmen N N, and shafts M M, in the manner as and for the purposes herein specified and shown.

GEORGE COMBS.

Witnesses:
J. BENEDICT,
J. E. L. HAMILTON.